R. J. FRANCIS.
SELF CLEANING HORSE LIFT HAY BUCK.
APPLICATION FILED FEB. 28, 1912.
1,077,059.
Patented Oct. 28, 1913.
4 SHEETS—SHEET 1.
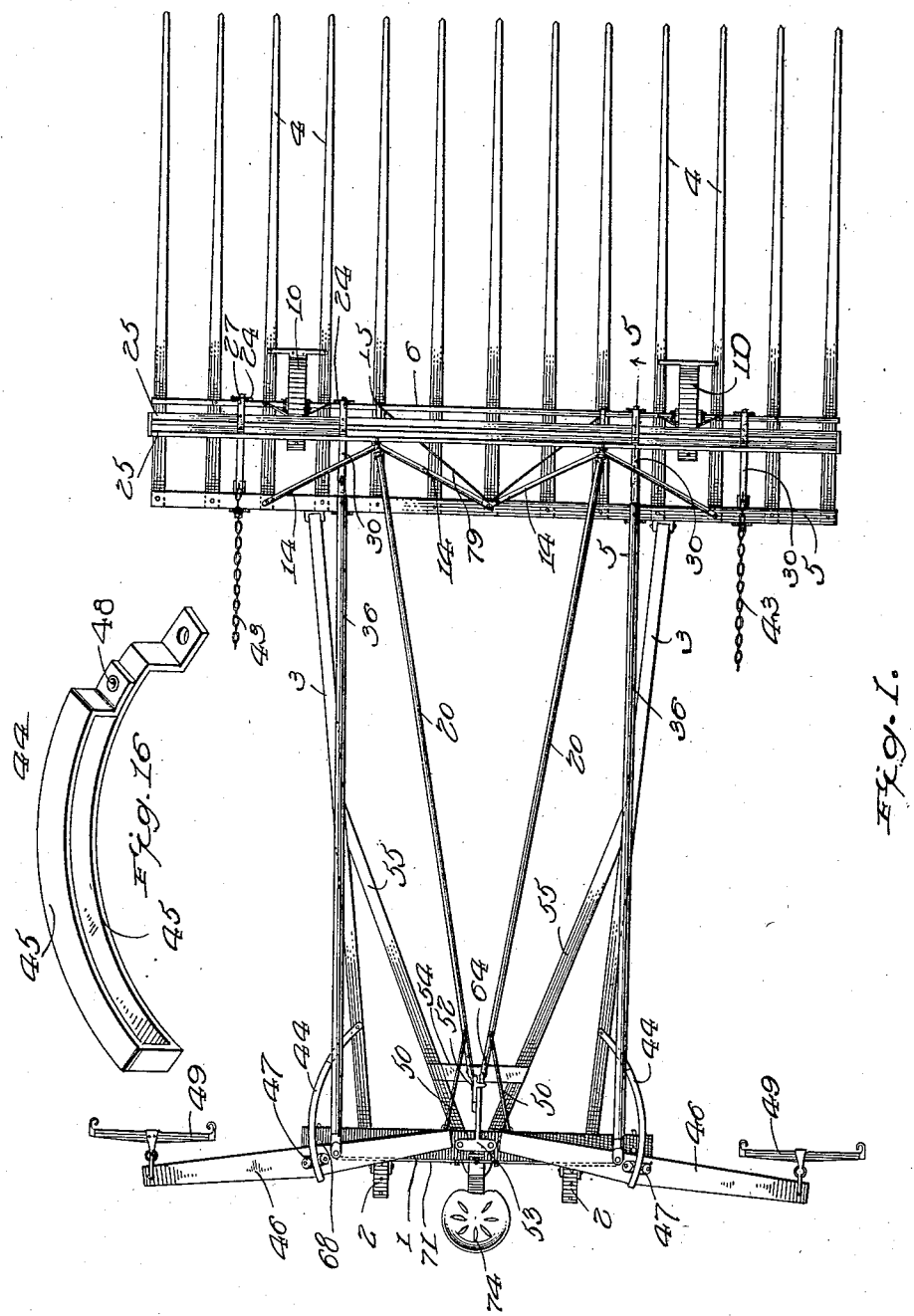
WITNESSES
INVENTOR
Raymond J. Francis
his Attorney

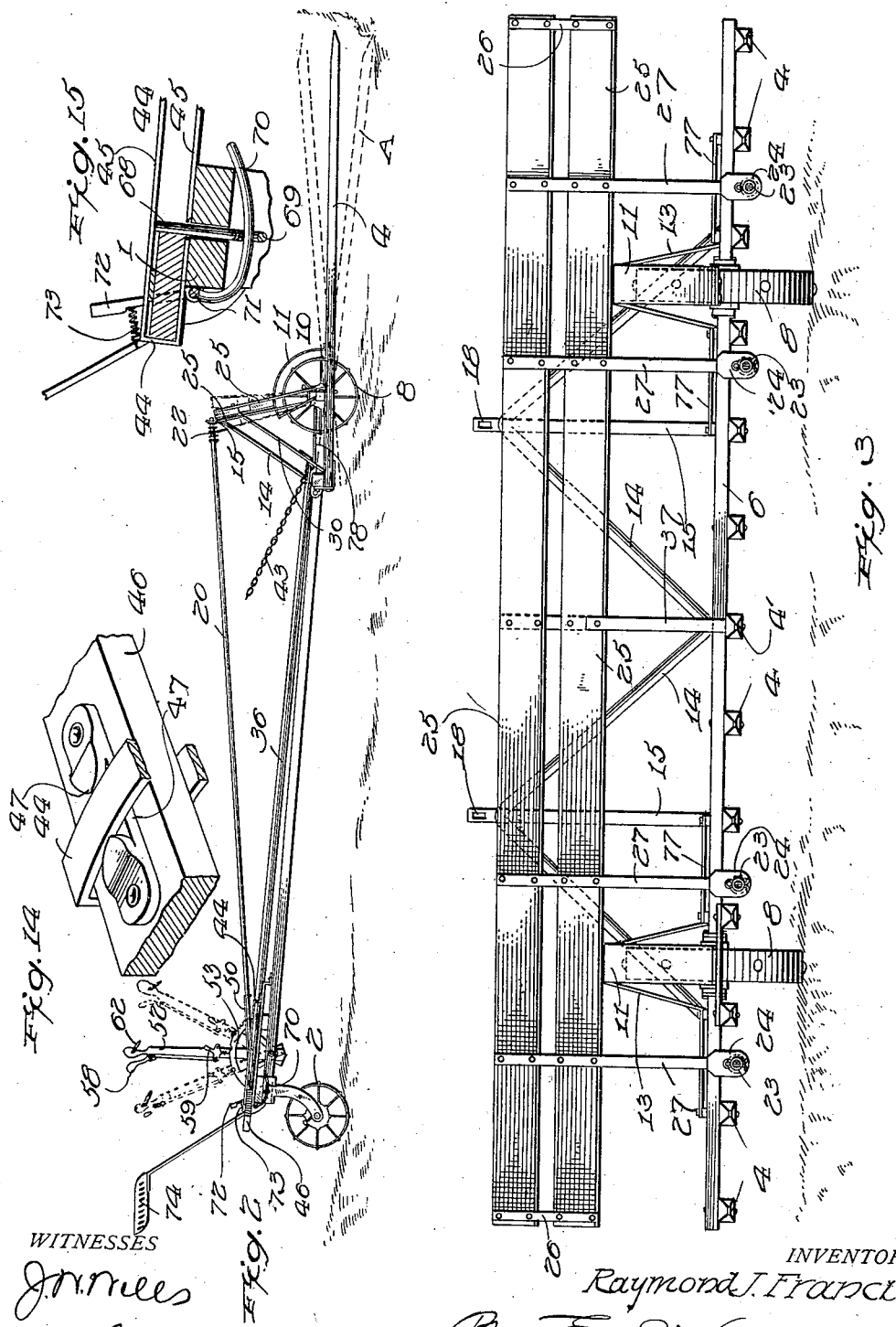

R. J. FRANCIS.
SELF CLEANING HORSE LIFT HAY BUCK.
APPLICATION FILED FEB. 28, 1912.
1,077,059.
Patented Oct. 28, 1913.
4 SHEETS—SHEET 3.
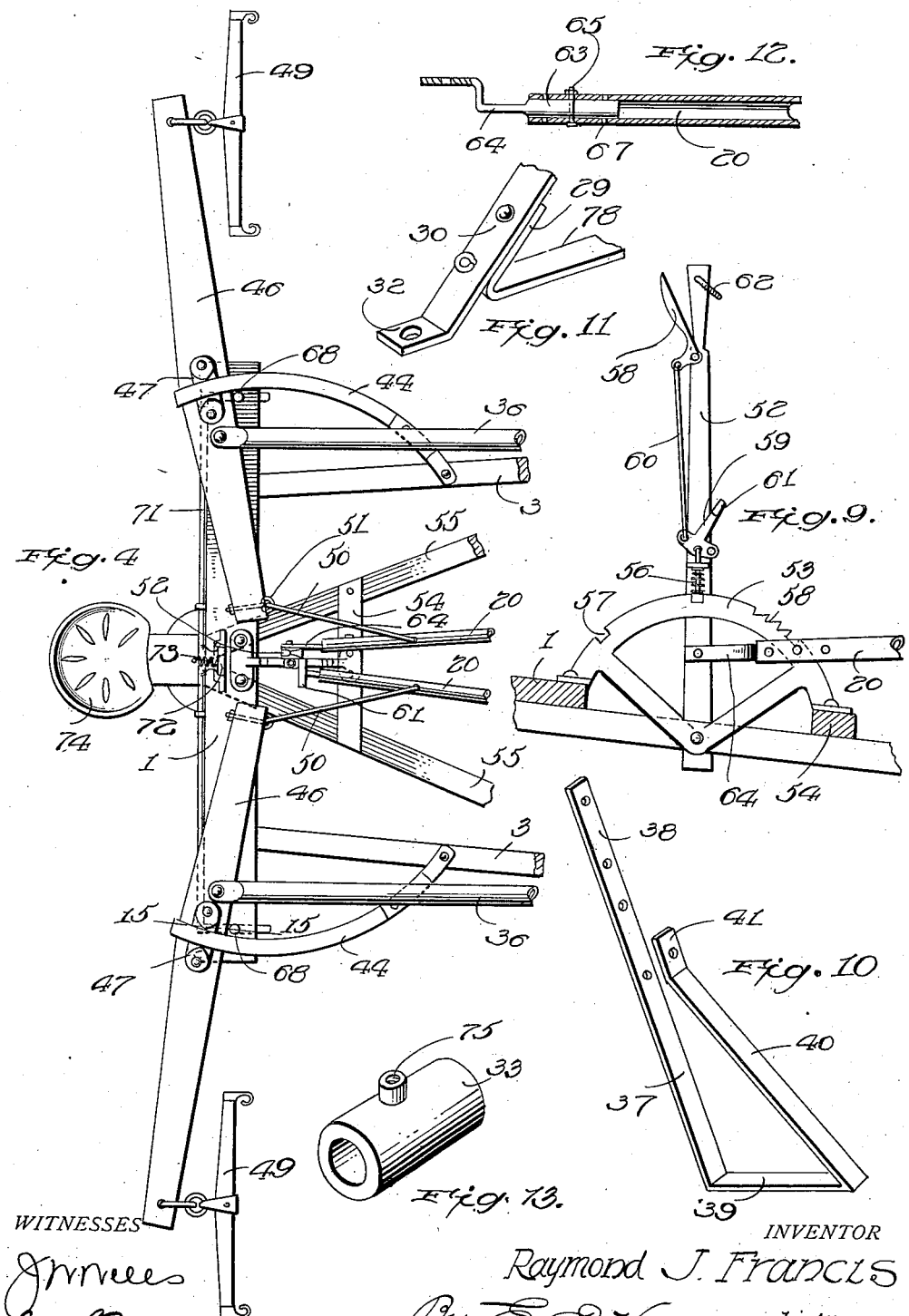
WITNESSES
INVENTOR
Raymond J. Francis
his Attorney.

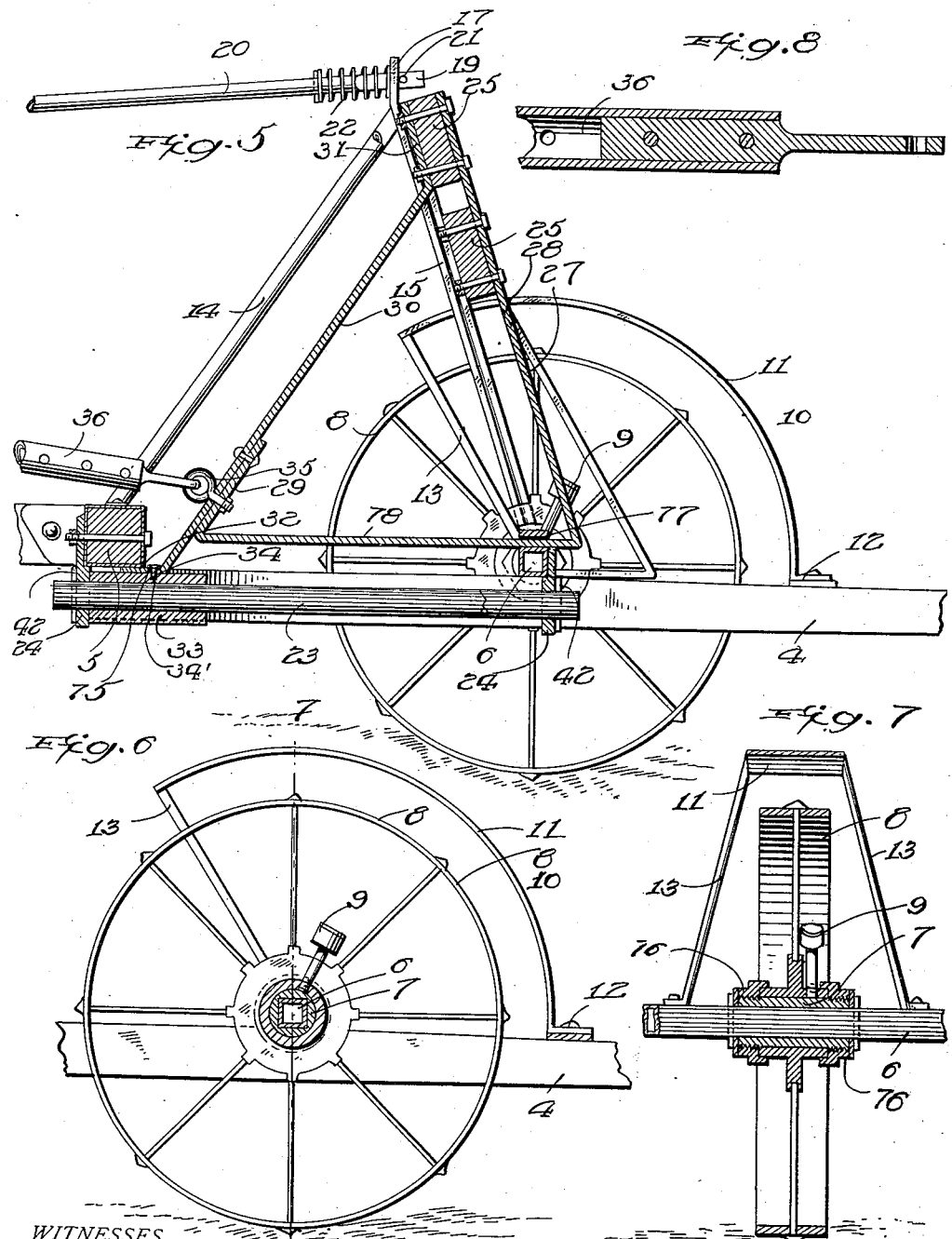

UNITED STATES PATENT OFFICE.

RAYMOND J. FRANCIS, OF GIBBON, NEBRASKA.

SELF-CLEANING HORSE-LIFT HAY-BUCK.

1,077,059. Specification of Letters Patent. Patented Oct. 28, 1913.

Application filed February 28, 1912. Serial No. 680,511.

*To all whom it may concern:*

Be it known that I, RAYMOND J. FRANCIS, a citizen of the United States, residing at Gibbon, in the county of Buffalo and State of Nebraska, have invented certain new and useful Improvements in Self-Cleaning Horse-Lift Hay-Bucks, of which the following is a specification, reference being had therein to the accompanying drawing.

This invention relates to self cleaning, horse lift hay bucks, and has for its object the production of a simple and efficient self-cleaning buck, the cleaning mechanism thereof being operated through the medium of the draft means.

Another object of this invention is the production of an efficient releasing means for quickly throwing the draft means into an operative position so as to operate the cleaning means for the buck.

With these and other objects in view this invention consists of certain novel constructions, combinations, and arrangements of parts as will be hereinafter fully described and claimed.

In the drawings Figure 1 is a top plan view of the hay buck. Fig. 2 is a side elevation thereof. Fig. 3 is a front view. Fig. 4 is a top plan view of the rear of the hay buck. Fig. 5 is a section taken on line 5—5 of Fig. 1, looking in the direction of the arrow. Fig. 6 is a section taken through the supporting wheel and protecting hood. Fig. 7 is a section taken on line 7—7 of Fig. 6. Fig. 8 is a longitudinal section of one end of the push pole. Fig. 9 is a side elevation of the ratchet controlling lever. Fig. 10 is a detail perspective of one of the cleaning frame supporting irons. Fig. 11 is a detail perspective of the rear portion of one of the cleaning frame supporting members to which the push poles are secured. Fig. 12 is a longitudinal section through the rear end of one of the lifting poles. Fig. 13 is a detail perspective of the sliding sleeve which shifts the cleaning frame. Fig. 14 is a detail perspective of one of the double trees showing the guiding socket carried thereby. Fig. 15 is a transverse section taken on line 15—15 of Fig. 4. Fig. 16 is a detail perspective of one of the guide frames for the cleaning frame operating levers.

The present machine is adapted to be used in connection with a stacker and as will be seen from the following description, the object of the present device is to produce a self-cleaning structure which will shove the hay or other material gathered by the buck upon the stacker fork. This is accomplished through the medium of the specially arranged mechanism hereinafter described for allowing the horses attached to the buck to transmit their energy to the cleaning mechanism, thereby relieving considerable labor on the part of the operator of the buck which has been previously necessary in order to accomplish the cleaning function of the buck.

By carefully considering Fig. 1, it will be seen that the buck comprises a rear frame 1 which is supported upon the usual idle wheels 2. A pair of divergently extending beams 3 are connected at their rear ends to the truck 1, and are connected at their outer ends to the gathering fork 4. This gathering fork 4 comprises a rear binding member 5 to which is attached the usual teeth, as illustrated clearly in Fig. 1. An intermediate brace member 6 is carried between the teeth of the buck near their rear ends as illustrated in Fig. 5. A shaft 7 is carried by the buck rake and upon this shaft 7 are mounted wheels 8 of the usual construction, having the usual oil cups 9. A fender frame 10 is carried by the teeth which are placed upon each side of the wheels 8, and this fender frame comprises an overhanging portion 11 having laterally extending feet 12 engaging the oppositely disposed teeth of the rail as clearly illustrated in Fig. 1. The rear end of the fender 10 is braced by means of a brace rod 13. Substantially V-shaped braces 14 are connected at their lower ends to the rear beam 5, and have their upper ends connected to a vertically extending frame or strap member 15, which strap member is fixedly secured to the transverse beam 6 of the buck at its lower end. The upper end of the strip or brace member 15 is provided with an angularly disposed end 17, which end is provided with an elongated aperture 18 in which fits the squared end 19 of the elevating or lifting or tipping rod 20. A pin 21 passes transversely through the squared portion 19 of the lifting or tipping rod 20, and limits the rearward movement of this rod through the aperture 18. A coil spring 22 is placed around the rod 20 near its forward end for constituting yielding means provided the front of the teeth should come in contact with an obstruction for allowing the teeth of the buck rake to tip slightly upward while loading the rake.

A plurality of cleaning frame supporting shafts 23 are interposed between the transversely extending braces 5 and 6, and these shafts 23 are suspended upon the hangers 24 depending from the brace members 5 and 6. The cleaning frame comprises a plurality of elongated members 25 which extend transversely of the buck, and these members 25 are connected at their extreme ends by means of straps 26. A plurality of brace members 27 also engage the members 25 as illustrated in Figs. 3 and 5, which brace members comprise a substantially V-shaped member having its upper ends bolted or otherwise secured to the members 25, and its lower upturned end 29 secured to a rear brace member 30. This brace member 30 is provided with an angle end 31 for engaging the rear face of the upper longitudinally extending member 25, and the lower angle end 32 of this brace member 30 engages a sleeve 33 which sleeve is slidably mounted upon the shaft 23. It should, of course be understood that each of the brace members 27 is so mounted upon the shaft 23 as just described, and as clearly illustrated in Fig. 5. The sleeve 33 is provided with a threaded aperture 34 for receiving a threaded pin 34' which pin has its head countersunk in the angular lower end 32 thereby holding the end 32 in engagement with the sleeve 33. An eye 35 is secured to the brace 30 and to this eye is connected the forward end of one of the push rods 36. A central brace member 37 is supported upon the central tooth 4' of the rake and comprises a substantially long upwardly extending end 38 which engages the rear face of the longitudinally extending members 25. This brace 37 is provided with a forwardly extending portion 39 which terminates in a rearwardly extending portion 40, which portion extends upwardly and at an angle to the rear having its angle end 41 connected to one of the longitudinally extending members 25, by means of the bolt or other suitable fastening means. Cotter pins 42 pass through the respective ends of the shaft 23 for holding the same against independent longitudinal movement.

As illustrated in Fig. 1, two of the braces 27 are arranged near each end of the cleaning frame, and one of these braces, preferably the inner brace on each side, is secured to the forward end of the push rod 36 in the manner as previously described. A chain 43 is connected to the outer frame 27 of each set, and this chain 43 is adapted to be attached to the collar of the draft animal operating the machine so that when the animal should back after the rake has been cleaned, the cleaning frame will be pulled to its original position to the rear of the cleaning lifting fork.

A pair of arc guide frames 44 have their inner ends connected to the respective beams or members 3, as illustrated in Figs. 1 and 4, and the rear ends of the guide frames 44 pass over the top of the rear truck 1. This guide frame 44 comprises an upper and lower guiding strap 45 as illustrated in Fig. 15, and between these guiding straps is adapted to fit the tree or lever 46. Of course, it should be understood that each of the guiding frames 44 and the lever 46 is of the same structure as just described. A guide socket 47 is carried by each of the braces or levers 46, and this guiding socket is provided with a channel groove 48, in which travels the upper strap 45 of the guide 44 so as to prevent the lever or tree 46 from having lateral movement, relative to the guide 44. It will therefore be seen that through the medium of this guide socket 47 the lever 46 will be firmly held in engagement with the guide 44. This guide frame 44 has one end fixedly secured to the beam 3 as above described and the other end bent over to form a loop as illustrated in Fig. 16. The end of the loop is securely fastened to the frame 44 as illustrated at 48 in Fig. 16. A swingle tree or other draft connecting means 49 is connected to the outer end of each of the levers or trees 46, and the inner end of the push pole or rod 36 is connected to the lever or tree 46 near the socket 47 as illustrated in Fig. 4. The inner ends of the levers 46 are connected to the lifting poles or rods 20 by means of link members 50. These link members 50 are connected to the levers 46 by means of eye bolts 51. The extreme ends of the rods 20 are connected to the operating lever 52 which operating lever 52 is pivotally secured to the quadrant 53. This quadrant 53 is supported upon the truck 1, and the transversely extending brace 54 which brace connects the diagonal braces 55 near their inner ends. The diagonal braces 55 have their extreme outer ends connected to the beams 3 whereas their extreme ends are connected to the truck 1, as illustrated in Fig. 4.

The operating lever 52 carries a spring dog 56, which dog is adapted to fit in the notches 57, and ratchet teeth 58 formed upon the quadrant 53. A dog lifting handle 58 is connected to a foot lift 59 which foot lift is pivotally secured to the lever 52. A link 60 connects the handle 58 with the foot lift 59. It will, thus be obvious that by squeezing the handle 58 upon the lever 52 that the dog 56 may be lifted out of one of the notches 57, and the same function may be performed by the operator merely placing his foot upon the laterally extending portion 61 of the foot lever 59. A link 62 is carried by the lever 52, and may be placed over the handle 50 for holding the dog 56 out of engagement with one of the notches 57 so that the lever may have free oscillatory movement upon the quadrant 53. The lifting pole or rod 20 comprises a hollow tubular member in which fits the tubular stem 63 of the lever connecting member 64. This lever connecting member 64 is so connected to the tubular lifting pole 20 as to allow the same to be adjusted by merely placing the bolt 65 in the different apertures 67 formed in the rear end of the pole 20. Through this means, it will be obvious that any play which might take place through the constant wear of the machine may be readily taken up by so adjusting the member 64 within the pole 20. A stop pin 68 is carried near each end of the frame 1, and the levers 46 abut against this pin, said pin acting as a fulcrum for said lever, and holding the push rods 36 against any material longitudinal movement while the pins are in such a position. It will, therefore, be seen that when it is desired to lift the forward end of the buck rake, the same may be accomplished either by swinging the lever 52 manually without the aid of the draft animals or the dog 56 may be released from one of the notches 57, and by causing the horses to move forward the rods 20 will be drawn rearwardly thereby causing the frame to tip upwardly to the position as shown in dotted lines in Fig. 2. The pin 68 is provided with an eye 69 upon its lower end in which eye works a hook member 70 formed upon the rod 71 which extends longitudinally of the frame 1, said rod being connected to the rear face of said frame. A foot lever of any desired construction 72 is carried by the frame 1, and is normally held in its vertical position by means of a coil spring 73. Of course, when it is desired to remove the pin 68 out of engagement with the levers 46, the foot lever 72 is pushed forwardly thereby drawing the pin 68 out of engagement with the levers 46, and allowing the levers to be pulled in a forward direction. As soon as the lever 72 is released, however, the pin 68 will be forced to its normal position through the medium of the spring 73. A seat 74 of the usual construction is carried by the frame 1.

When it is desired to clean the buck rake, the pins 68 are released from in front of the levers 46, and as the horse or draft animal pulls forwardly the levers 46 will be swung to such a position to cause the cleaning rods to move forwardly thereby pushing the cleaning frame forwardly, which will cause the sleeves 33 to slide upon the shafts 23. As will be noticed in Fig. 13, as well as in Fig. 5, the sleeve 33 is provided with an upwardly extending portion 75 which projection 75 extends through the angle foot 32 of the brace 30 constituting an anchoring means therefor. The shaft 7, above mentioned, comprises a sleeve as is clearly illustrated in Fig. 7, which sleeve fits over the square brace 6, and this sleeve is provided with threaded ends over which the nuts 76 fit for holding the wheel 8 against lateral movement.

As above stated, the buck rake is moved along the field gathering up the hay or other material desired, and is then brought to the hay lift whereupon the buck fork is placed in front so as to have the teeth of the lifting rake interlock with the teeth of the buck rake. As soon as the hay or other material is gathered from the ground, during which operation the teeth of the buck rake take the position as shown in dotted lines, and indicated by the letter A in Fig. 2, the lever 52 is swung backwardly to engage the rear notch 57 thereby causing the forward end of the teeth to extend upwardly at an angle for holding the hay upon the fork. This operation takes place by merely swinging the lever 52 backwardly through the edge of the levers 46 acted upon by the draft animals as above described. When the buck rake is brought to the desired position relative to the lift rake, the pins 68 are released from the levers 46, and by driving the horses forward the cleaning frame will be shoved forward as above described, to a sufficient distance to have the hay or other material contained upon the rake to be engaged by the lift rake. The horses or draft animals are then backed, withdrawing the buck rake from the lift rake and by so backing the horses will, of course, pull upon the chains 43 causing the cleaning frame to come to its normal position as shown in full lines in Fig. 2.

From the foregoing description, it will be obvious that a very efficient and durable device has been produced which may be very efficiently operated and in view of the fact that the operation of the levers, etc., will be greatly aided by means of the draft animals, considerable labor on the part of the operator will be relieved.

A guide member or strap 77 straddles each of the horizontally extending members 78 of each connecting member 28 for holding the cleaning frame firmly upon the rake frame, as is clearly illustrated in Figs. 3 and 5. A brace member 79 is also carried by the frame of the rake and engages the transversely extending member 6 and the rear binding member 5.

What is claimed is:—

1. A buck rake of the class described comprising a truck, a rake carried to the front of said truck, tipping means therefor, a cleaning frame carried by said rake, draft means carried by said truck, connecting means for said cleaning frame and draft means, and means for releasing said draft means from said truck and causing said draft means to reciprocate said cleaning frame upon said rake.

2. A buck rake of the class described comprising a truck, a rake carried by said truck, means for tipping said rake, a cleaning frame reciprocating upon said rake, draft means carried by said truck, and means for releasing said draft means from said truck for allowing the shifting of said cleaning frame upon said rake.

3. A buck rake of the class described comprising a truck, a rake carried in front of said truck, a cleaning frame carried by said rake, levers carried by said truck, draft trees carried by said truck, removable pivot pins carried by said truck and engaging said draft trees for preventing the bodily forward movement of said levers upon said truck, tipping rods connected to said rake and said levers, locking means connected to said tipping rods, said levers being adapted to force said cleaning frame forwardly with relation to the rake when said pivot pins are removed.

4. In a buck rake of the class described, the combination with a truck, of a rake pivotally mounted in front of said truck, cleaning means for said rake, and levers connected to said truck, tipping rods connected to said levers and rake, push rods connected to said levers and cleaning frame, detachable pivot pins carried by said truck, means for releasing said pivot pins from engagement with said levers, a guide strap coöperating with said levers and being adapted to hold the same against displacement from said truck, and means for locking the inner ends of said levers against pivotal movement about said pivot pins as centers.

5. In a buck rake of the class described, the combination with a truck, levers carried by said truck, a rake carried in front of said truck, cleaning means for said rake, tipping rods carried by said rake and connected to said levers, push rods connected to said levers and cleaning frame, releasable pivot pins carried by said truck and engaging said levers and being capable of allowing said levers to be swung upon said frame when said pins are released from said levers, and guiding means engaging said levers for limiting the movement thereof upon said truck.

6. A rake of the class described comprising a plurality of tipping rods, brace means for said tipping rods, a cleaning frame, braces for said cleaning frame, shafts carried by said rake, means positioned upon said shaft and carried by said cleaning frame for allowing said frame to be reciprocated upon said rake, means for reciprocating said cleaning frame upon said rake, and said tipping rods constituting a stop for limiting the rearward movement of said cleaning frame.

7. A cleaning mechanism for a rake comprising a truck, a lever carried by said truck, pivot pins removably mounted upon said truck and extending therethrough and capable of having vertical movement, each pivot pin provided with an eye upon its lower end, a releasing rod, an operating lever secured to said releasing rod, hook members carried by said releasing rod and passing through said eyes in said pivot pins for causing said pivot pins to be withdrawn from engagement with said lever when said lever is moved forwardly, a cleaning frame, and means connecting said cleaning frame with said lever for moving said cleaning frame forwardly as said lever is swung.

8. A cleaning device for a rake comprising a truck, a lever pivotally mounted thereon, removable pivot pins engaging said lever and engaging the same in a set position upon said truck, guiding frames carried by said truck, said levers passing through said guiding frames, and a guiding socket carried by each lever and straddling said guiding frame for retaining lateral movement of said levers relative to said frame.

In testimony whereof I hereunto affix my signature in presence of two witnesses.

RAYMOND J. FRANCIS.

Witnesses:
W. A. SPENCER,
W. C. OGILVIE.

---

Copies of this patent may be obtained for five cents each, by addressing the "Commissioner of Patents, Washington, D. C."